United States Patent [19]

Resa et al.

[11] 4,188,058
[45] Feb. 12, 1980

[54] SELF DRAINING TRUCK BED FLOORINGS

[76] Inventors: Richard N. Resa, 3220 Susan Dr., Hannibal, Mo. 63401; David M. Kuntzi, #1 Skyline Dr., Louisiana, Mo. 63353

[21] Appl. No.: 894,725

[22] Filed: Apr. 10, 1978

[51] Int. Cl.² .............................................. B60N 3/04
[52] U.S. Cl. ..................................... 296/208; 296/1 F
[58] Field of Search ............................ 296/1 F, 28 D

[56] References Cited
U.S. PATENT DOCUMENTS

| | | | |
|---|---|---|---|
| 1,019,212 | 5/1912 | Yates | 296/1 F |
| 3,068,038 | 12/1962 | Douglass | 296/28 D |

*Primary Examiner*—Philip Goodman
*Attorney, Agent, or Firm*—Thomas M. Scofield

[57] ABSTRACT

Improvements in truck bed flooring for both open and enclosed bed trucks; self draining flooring constructions which drain by geometrical configuration of the flooring, not by openings in or associated with the flooring; centrally sloped flooring constructions overlaid by mesh superflooring; corrugated flooring constructions with the corrugation valleys sloped front to rear.

8 Claims, 13 Drawing Figures

U.S. Patent  Feb. 12, 1980  Sheet 1 of 3  4,188,058
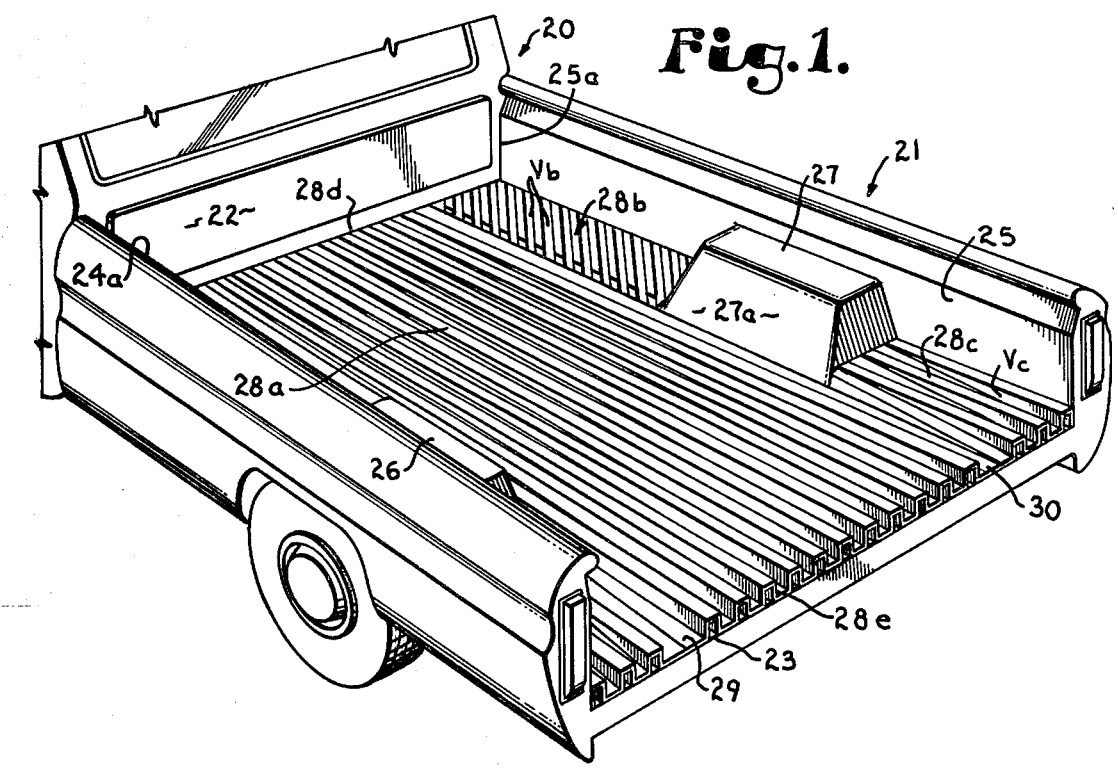
Fig.1.
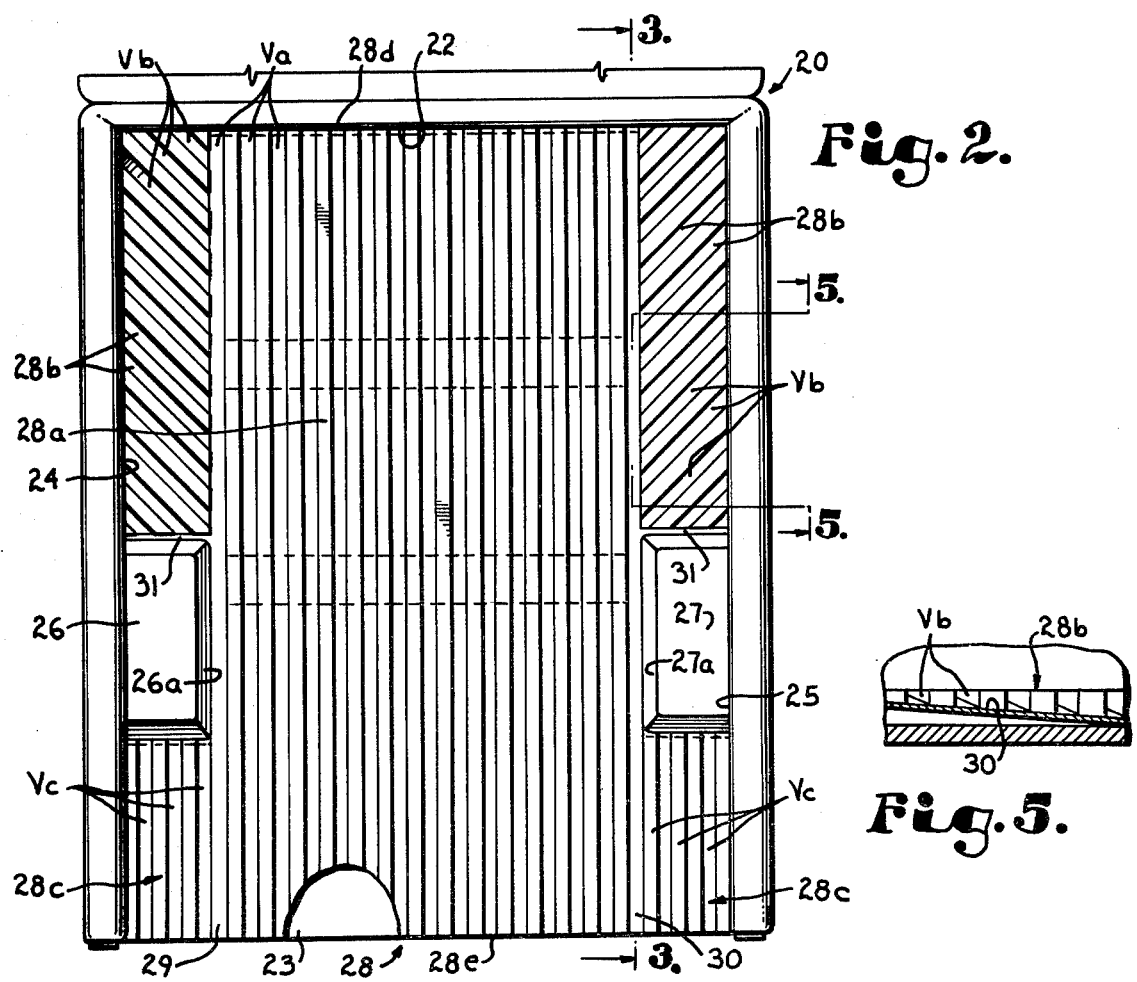
Fig.2.
Fig.5.

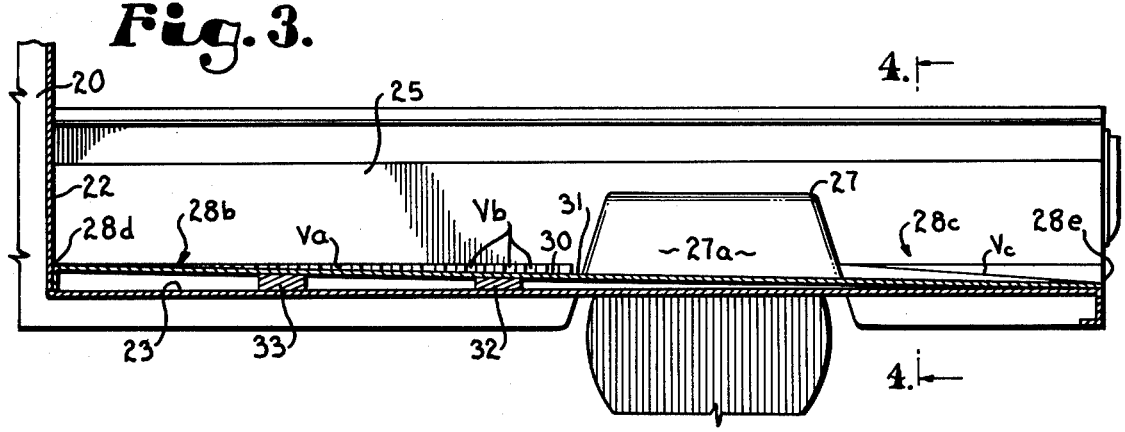
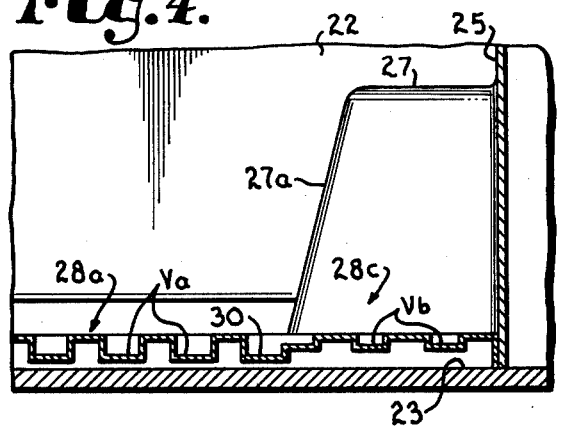
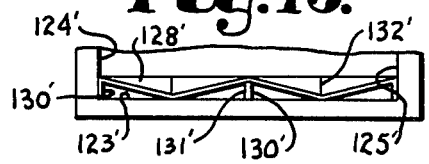
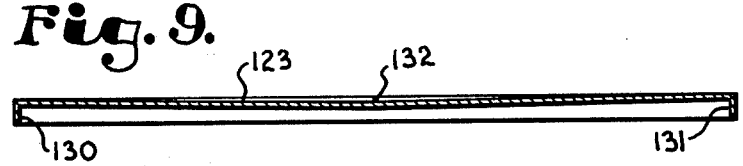
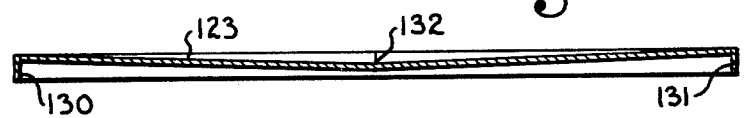
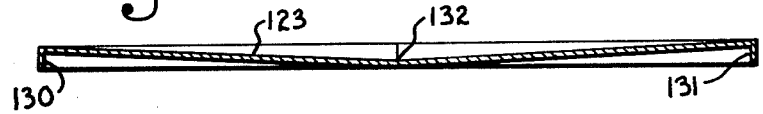

SELF DRAINING TRUCK BED FLOORINGS

BACKGROUND OF THE INVENTION

Water and liquid damage to cargo and packages transported on the floor beds of trucks, van and like vehicles is a major problem. In open bed trucks, for example, such as pickup trucks, the most obvious source of potentially damaging water and the like is from rain and snow which precipitate directly into the open, unprotected bed. This is a lesser problem in more or less enclosed trucks or vans, but rain water, ground water and snow may get into such vehicles and their cargo enclosures by various means such as on the packages themselves, the clothing and shoes of loaders, in through open doors during loading and the like.

Yet another major cause of liquid contamination of packages and their contents in cargo trucks and vehicles is from leaking and broken containers in one or more of the packages themselves or from bottles, cartons, barrels or the like which may rupture, break, leak or be perforated in some manner. The entire point of this exposition is that, in conventional cargo trucks beds, once water or liquid gets into the bed in any measurable quantity, the problem of liquid contamination of the other contents of the cargo bed very often immediately or quickly occurs. This may take the form of mere packaging damage or deterioration, but often proceeds to damage, contamination or injury to contents as well.

As a solution, configuring the floor structure of these beds, as in the manner of some of the patents below listed, has been attempted to minimize these damage effects. However, this has been successful only to a limited extent. Merely configuring or corrugating a truck floor without providing drainage merely delays the damage until the liquid rises to a level to contact the packages or is thrown onto the packages by motion of the truck. If drainage openings are provided of conventional sort, they are susceptible to back passage of water from the road and the like coming up from the underside of the truck. Additionally, such drainage openings often clog.

There is yet another problem caused by liquid materials resident in the truck and vehicle cargo beds, specifically, cleaning out of the floors. To the extent that floors are configured and not effectively drained, mere configuring merely makes cleaning more difficult. In commercial package cars and cargo trucks which haul freight, it is most desirable to have a nightly cleanup which requires a minimum of effort and wherein all dust, trash and liquid can be simply hosed out of the truck bed floors, leaving the interior clean and dry.

What is desired are flooring constructions for both open bed and closed bed trucks which will meet these problems with rugged yet relatively inexpensive flooring constructions, protect the cargo from liquids which get into the truck bed from one source or another, readily permit periodic cleanout with a minimum of effort, seal out dust and rain water from underfloor or road infiltration, keep the truck's cargo space warmer and drier, and minimize package and cargo sliding and damage.

THE PRIOR ART

It is not uncommon for railroad cars or trucks, in the flooring construction thereof, to be corrugated, either transversely or lengthwise, sometimes both. Drainage openings may or may not be provided with respect to these constructions. Typical Patents showing conventional constructions are:

Travis, Jr. U.S. Pat. No. 1,806,428 issued May 19, 1931 for "Metallic Truck Body";

Sisson U.S. Pat. No. 2,113,863 issued Apr. 12, 1938 for "Floor Rack for Refrigerator Cars";

Watter U.S. Pat. No. 2,275,037, issued Mar. 3, 1942 for "Panel Section";

Black U.S. Pat. No. 2,615,751, issued Oct. 28, 1952 for "Extruded Floor Section . . . ";

Bohlen U.S. Pat. No. 2,767,015, issued Oct. 16, 1956 for "Enclosures . . . ";

Sheppard U.S. Pat. No. 2,857,196, issued Oct. 21, 1958 for "Insulated Load Supporting Structural Beams . . . "; and Turnbull, et al U.S. Pat. No. 3,185,519, issued May 25, 1965 for "Platform Trailer".

In the previous group of Patents, in some cases, a portion of the floor itself may be inclined. It is also known to provide slanted floors with level floors thereabove for drainage purposes. Typically, these slant laterally, from side to side or centrally to a drain or the like. Such constructions are exemplified by:

Murphy U.S. Pat. No. 2,142,798 issued Jan. 3, 1939 for "Refrigerator Car Floor"; and Johnson U.S. Pat. No. 2,360,686, issued Oct. 17, 1944 for "Self Air Conditioning Bulk Commodity Railway Car".

Perhaps more common than the previous type mentioned constructions are floors which are sloped for water or other liquid drainage, per se. This may be either longitudinally or laterally. In the latter case, typically the flooring slants downwardly to each side from a high center ridge. Thus see:

Lundvall U.S. Pat. No. 2,320,001 "Floor Structure For Railroad Cars" issued May 25, 1943;

Battley et al U.S. Pat. No. 2,480,695 issued Aug. 30, 1949 for "Steel Floor For Refrigerator Cars";

Bennett U.S. Pat. No. 2,872,240 "Trailer Van With Sloping Floor" issued Feb. 3, 1959 and Hamilton et al U.S. Pat. No. 2,409,273 issued Oct. 15, 1946 for "Refrigerator Car Drip Pan".

OBJECTS OF THE INVENTION

A first object of the invention is to provide improved floor or flooring constructions for trucks which will provide improved drainage characteristics and capabilities for the floors.

A second object of the invention is to provide improved floor or flooring structures or constructions for truck beds of various sorts wherein an inclined run off is provided for water or other liquids, grading toward the rear of the truck, yet wherein a level floor construction for supporting cargo is provided.

Another object of the invention is to provide such floor drainage constructions which will operate to effectively drain the floors in question despite the presence of upwardly protruding housings for the wheel wells within the truck bed.

Another object of the invention is to provide floor and flooring constructions for use on truck beds of various sorts wherein drainage is provided for the entire truck floor bed, whatever its basic and accessory construction may be, yet wherein no drainage holes or openings are required through any part of the truck bed, which are undesirable.

Another object of the invention is to provide such improved, draining truck bed floors wherein, due to the construction of the floors, the truck beds may be cleaned by simply hosing out the inside of the trucks or the truck bed, with the corrugated or slanted and tapered floor carrying all dust and trash out the rear end of the truck, thus saving time and leaving the interior of the truck clean and dry.

Another object of the invention is to provide an improved draining truck bed flooring construction for a pickup truck, which flooring construction will drain the entire truck bed floor, particularly including around the wheel wells.

Another object of the invention is to provide slanted and tapered underflooring for a cargo truck bed which has, thereover, a level, grated upper flooring which will minimize water or other liquid damage to truck cargo and remove liquids which may enter the truck, including those from spilled, broken or damaged freight, from contact with other cargo by letting the said liquids run away under the grating from the other freight and out of the truck bed.

Yet another object of the invention is to provide such flooring constructions as described which are utilizable in limited area cargo carrying zones, including shelving and stepped truck floor zones.

Other and further objects of the invention will appear in the course of the following description thereof.

THE DRAWINGS

In the drawings, which form a part of the instant specification and are to be read in conjunction therewith, embodiments of the invention are shown and, in the various views, like numerals are employed to indicate like parts.

FIGS. 1-6, inclusive are directed to a first form of draining truck bed construction particularly adapted to open truck beds as are found in pickup trucks and the like.

FIG. 1 is a three-quarter perspective view from above of a first draining truck bed construction.

FIG. 2 is a vertical plan view from above of the truck bed construction of FIG. 1.

FIG. 3 is a view taken along the line 3—3 of FIG. 2 in the direction of the arrows.

FIG. 4 is a view taken along the line 4—4 of FIG. 3 in the direction of the arrows.

FIG. 5 is a view taken along the line 5—5 of FIG. 2 in the direction of the arrows.

FIGS. 6-13, inclusive illustrate a self-draining truck floor construction which is particularly adapted to enclosed truck beds.

Figure 6:
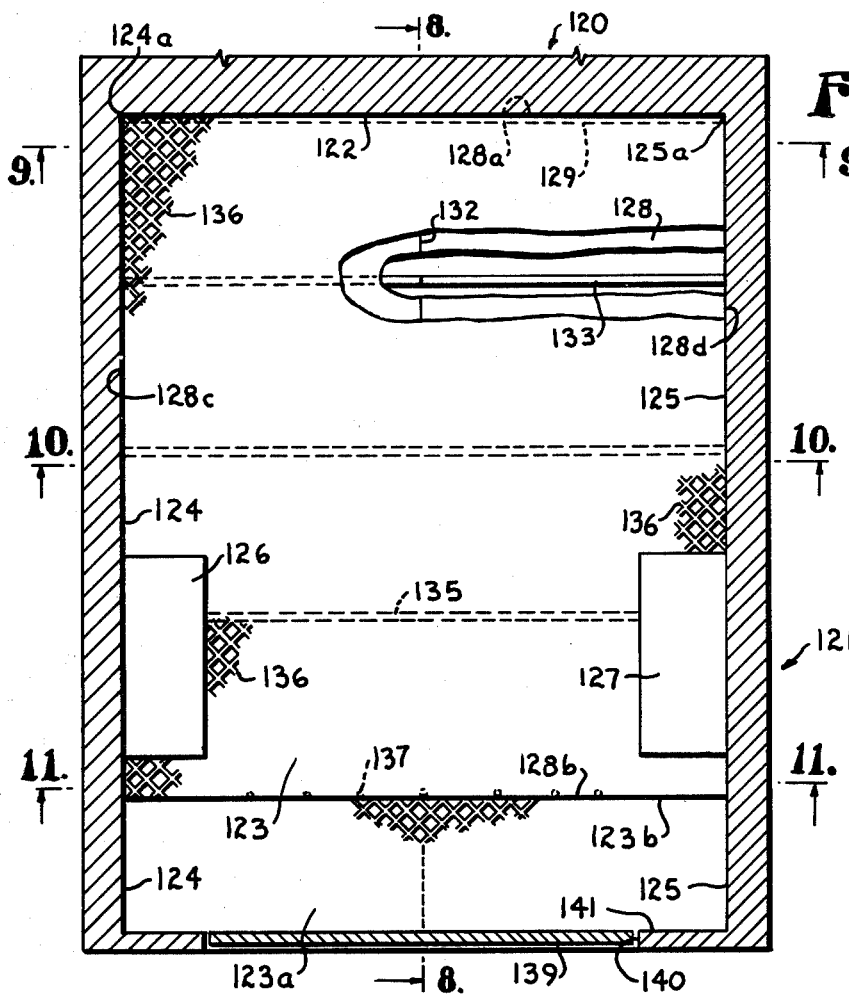

FIG. 6 is a vertical plan of the interior floor area of a truck taken from above.

Figure 7:
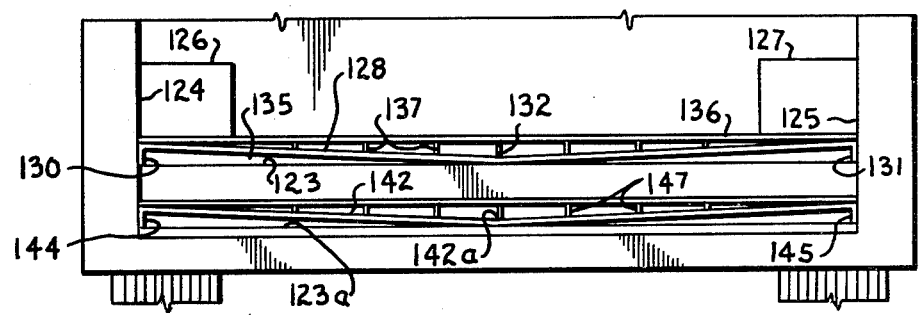

FIG. 7 is an end view of the flooring construction and truck floor bed of FIG. 6 looking from the rear end of the truck forwardly or, stated in terms of the Figures, looking upwardly in FIG. 6 from the bottom of the view.

Figure 8:
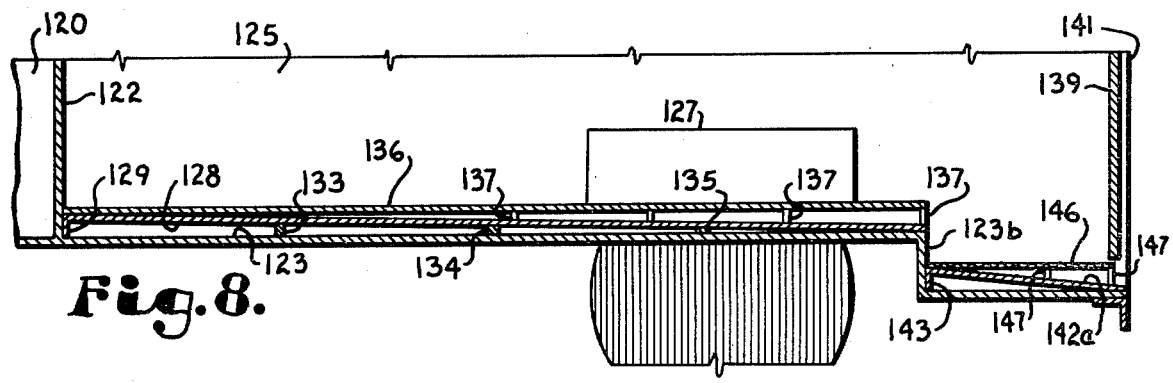

FIG. 8 is a view taken along the line 8—8 of FIG. 6 in the direction of the arrows.

FIG. 9 is a view taken along the line 9—9 of FIG. 6 in the direction of the arrows.

FIG. 10 is a view taken along the line 10—10 of FIG. 6 in the direction of the arrows.

FIG. 11 is a view taken along the line 11—11 of FIG. 6 in the direction of the arrows.

FIG. 12 is a three-quarter perspective view from above of one of the braces supporting the underfloor of the construction of FIGS. 6-11, inclusive.

FIG. 13 is a fragmentary end view of a modified version of the floor of FIGS. 6-12, inclusive taken from the same viewpoint as FIG. 7.

FIGS. 1-5, INCLUSIVE

A first form of draining flooring for a substantially rectangular truck bed is shown in FIGS. 1-5, inclusive. This particular flooring, either insert or integral, is best adapted to an open bed truck, such as the pickup truck shown in the drawings.

The truck structure partially shown in the views involves a cab portion generally designated 20 and a truck bed portion generally designated 21. The rear wall 22 of the cab portion serves as the front end wall of the truck bed portion. The truck bed also has a floor or bottom wall 23 and two side walls 24 and 25. The front and side walls 22, 24 and 25 are normally substantially vertical and the floor or truck bed is normally substantially horizontal. The sides walls 24 and 25 meet at their front ends 24a and 25a at substantial right angles with the side edges of the front wall. The side and front walls meet the bottom wall at their lower edges. All connections are typically welded or otherwise watertight sealed. Typically, wheel wells 26 and 27 extend upwardly from the bottom wall 23 and also abut or are integral with walls 23, 24 and 25. Again, all edge connections or junctures are typically watertight, welded or otherwise sealed.

The floor construction comprising the specific inventive improvement, here shown as an insert flooring, rather than an integral bottom floor, comprises a substantially rectangular sheet of rigid, strong, water resistant material which at least substantially and preferably entirely overlies the entire bottom wall of the truck bed. This sheet preferably abuts or at least substantially abuts truck bed front wall 22 with the front edge thereof and the side walls of the pickup with side edges thereof. The sheet is corrugated longitudinally, at least in the center portion thereof, between wheel wells 26 and 27 at least substantially the entire length thereof from front to rear and preferably the entire length thereof. The crests of the corrugations parallel one another and are preferably normally horizontal so that they parallel, normally, the truck bed bottom wall surface 23. The valleys of the corrugations likewise substantially parallel one another and increase substantially uniformly in depth from the front edge of the sheet to the rear edge of the sheet.

If there were no wheel wells 26 and 27 in the truck bed space, all the corrugations would be uniform as in the center of the bed shown between the wells 26 and 27.

Referring to FIG. 2, particularly, it may be seen that the insert flooring there illustrated, specifically, the said sheet of rigid, strong, water resistant material, has essentially three zones thereto. This sheet is generally numbered 28 and has a central zone 28a between the wheel wells 26 and 27, that is, the inboard edges or faces thereof. There are two zones designated 28b forward of wheel wells 26 and 27 and two zones designated 28c at or rearward of the wheel wells 26 and 27. In zone 28a, the corrugations and the valleys therebetween run, as noted, from the front edge 28d of said sheet, uniform in width, rearwardly to the rear edge 28e of sheet 28. The depth of the corrugations in the sheet, specifically, that is, the thickness of the sheet, including the corrugations, is determined by the desired drainage angle over the length of the truck bed. That is, for a shorter truck bed, the corrugations (and sheet thickness) may be of lesser height. For a longer truck bed, the corrugations are preferably of greater height and the sheet thickness likewise of greater dimension.

In the zones 28c, the drainage length of the corrugation valleys is only from the rear or aft walls of the wheel wells to the end of the truck. This means that the angle of decline from adjacent the rear walls to the truck wheel wells is far greater in zone 28c than in zone 28a.

At the side edge (each side edge) of zone 28a, immediately inboard of the inboard faces 26a and 27a of the wheel wells, there are corrugation valleys 29 and 30. With respect to zones 28c, the adjacent zones to valleys 29 and 30 may be either valleys or ridges of the corrugations. If ridges, no drainage would take place between the two adjacent parts. If valleys, there would be some cross drainage toward the rear of the truck. Section 28a may be entirely separate from sections 28b and 28c so as to be more readily insertable in and removable from the truck bed. In such case, it is necessary that the side edges of zones 28a seal against and with the side edges of zones 28b and 28c.

Referring to zones 28b, optionally, the corrugations in zones 28b may be parallel to the corrugations in zone 28 and like same. In such case, there must be a drainage channel at the rear of the corrugations and corrugation valleys in zone 28b to carry water into the channels 29 and 30.

In zone 28b, there are provided a series of 45 degree angle (from the longitudinal axis of the truck bed) corrugations whose ridges are horizontal. The valleys thereof start at a zero depth at the front and side walls and run to a depth equal to the depth of the channel 29 or 30 at the point of juncture of the angled corrugation valleys with the drainage channels 29 or 30. Thus, the corrugation valleys of the zones 28b are extremely shallow adjacent the front of the truck bed, increasing in depth (at their discharge ends inboard of the truck bed) rearwardly.

The corrugation valleys in zone 28a are marked Va. The corrugation valleys in zones 28b are marked Vb. At the rearward ends of zone 28b, there is a drainage channel 31 which empties into channel 29 or 30. FIG. 5 shows the feed exits of the troughs of the corrugations in zone 28b into channel 30.

As illustrated, preferably, the crests and valleys of the corrugations are substantially rectangular in form in transverse section. This applies to the corrugations in each of the zones 28a, 28b and 28c. Preferably, but not necessarily, the side edges of sheet 28 in zone 28c have the crests of the corrugations thereat. Since the depths of the corrugation valleys at the front 28d of sheet 28 and the sides thereof in zones 28b is zero, the periphery of sheet 28 in zones 28a and 28b is at a level equal the greatest height of the sheet. This being so, preferably, vertical support walls are provided around the outboard periphery of these zones and areas. Likewise, at the troughs 31, thereunder, vertical walls are preferably provided reaching to the truck bed floor extending downwardly from the portion of said troughs adjacent the front faces of wheel wells 26 and 27. Yet further, the outboard portions of channels 29 and 30 preferably each have depending vertical walls there under. In the event that sections 28b and 28c are distinct parts different from center zone 28a, then vertical facing walls would be provided along the outboard edges of channels 29 and 30 the length thereof and inboard facing walls along the entire inboard length of zones 28b and 28c to abut thereagainst. The front ends of zones 28c also preferably have vertical depending walls extending downwardly therefrom abutting against the rear walls of wheels wells 26 and 27.

In short, the abutting sections of the insert floor with one another, the pickup side and front walls and the wheel wells have floor contacting vertical support walls as required. Alternatively an overlap engagement may be employed in the former as in FIG. 4.

To give additional support (see FIG. 3), transverse braces or supports 32 and 33 are provided extending transversely of the sheet 28 thereunder at intervals there along. These braces preferably extend the entire width of the sheet to the vertical side walls of the sheet previously mentioned or under the respective sections between supporting walls thereof.

In the event that the configured flooring as described is made integral in the truck bed itself, there may or may not be provided a base flooring which is flat as in the case of truck bed 23 under the flooring structure. If there is not such a base flooring which permits the use of supports thereover as in the manner of supports 32 and 33 seen in FIG. 3, then structural beams may necessarily have to be provided between the side walls of the truck bed for floor support along the length of the floor. With the draining flooring construction as described made integral, such would be sealed or welded around the periphery thereof to the front and side walls of the truck bed, as well as to the wheel wells walls to provide a circumferentially water resistant floor structure.

Pickup truck beds are typically 8 to 12 feet long. With such length variation, the depth of the valleys of the corrugations at the rear end of the pickup, assuming the front end depth zero inches, would typically range from 2 to 8 inches. A very short pickup bed might have less fall. A perforated grating or mesh (not shown but like mesh 136 of the later figures) may be employed over the floor.

Under certain circumstances the hills of the corrugations may be wider than the valleys or vice versa. In the former case more level flooring for support is provided, in the latter more drainage surface.

Where zones 28b have longitudinal corrugations the slope and depth thereof is the same as in zone 28a so rear end drainage into channels 29 and 30 is effective. If desired the corrugations in zones 28b may drain laterally into channels 29 and 30 at right angles thereto. The valley depths are the same as at their connection with channels 29 and 30 at their inboard ends and zero at the side walls. In such case the forward zones 28b begin with a hill, ending with a valley in front of wheel wells 26 and 27.

This flooring can be used in tractor trailers with no side wheel wells of ten to twenty foot length. Again, corrugation valley depths at the rear end (front depth zero) typically would run two to ten or twelve inches. For an insert flooring to have level corrugation hills, the peripheral walls must be of depth equal the rear end valley depths.

FIGS. 6–12, INCLUSIVE

The numbering with respect to these Figures will start with 100 to avoid confusion with the numbering of the previous set of Figures.

A second form of draining flooring for a substantially rectangular truck bed is shown in FIGS. 6–12, inclusive. This particular flooring, either insert or integral, is best adapted to a closed bed truck, but may be used in a pickup truck bed as seen in the previous figures.

The truck structure partly shown in the views involves a cab portion generally designated 120 and a truck bed portion generally designated 121. The rear wall 122 of the cab portion serves as the front end wall of the truck bed portion. The truck bed also has a forward floor or bottom wall 123 and a rear (back step) bottom wall or floor portion 123a at a level below that of the forward bottom wall 123. Side walls 124 and 125 and front wall 122 are normally substantially vertical and the floors 123 and 123a (or front and rear truck bed portions) are also normally substantially horizontal. Side walls 124 and 125 meet at their front ends 124a and 125a at substantial right angles with the side edges of the front wall 122. The side and front walls meet bottom wall 123 at their lower edges. Rear floor or bottom wall 123a has a front normally vertical wall 123b joining the front edge of floor 123a and the rear edge of floor 123. The side edges of floor 123a and wall 123b join side walls 124 and 125 in the rear portions thereof. All side edge connections or junctures are water tight, welded or otherwise sealed.

The floor construction comprising the specific inventive improvement of FIGS. 6–12, inclusive, has two parts. The first part overlies forward floor or bottom wall 123. A second like, but shorter construction overlies rear floor 123a. They will be separately described. Wheel wells 126 and 127 (for the vehicle rear wheels) typically extend upwardly from front floor 123 and also abut or are integral with side walls 124 and 125, as well as floor 123. All edge connections or junctures are water tight, welded or otherwise sealed.

The floor construction comprising the specific inventive improvement, here shown as an insert flooring (actually two insert floorings over the two floor portions 123 and 123a), rather than integral bottom floors, basically comprises a substantially rectangular sheet of rigid, strong, water resistant material which at least substantially (and preferably entirely) overlies the entire bottom wall 123 of the truck bed. A like but shorter construction overlies preferably entirely the entire lower rearward bottom wall 123a of the truck bed. The front sheet preferably abuts truck bed front wall 122 with the front edge thereof and the side walls of the truck bed with the side edges thereof. The sheet overlying the front floor portion 123 will be first described.

This front sheet 128 has a front edge 128a, a rear edge 128b and side edges 128c and 128d. Sheet 128 is smooth and entirely horizontal (uniform level) at its front edge 128a. This front edge 128a is elevated above floor 123 by a vertical wall 129. The side edges 128c and 128d are also normally horizontal and elevated above floor 123 by side walls 130 and 131. The latter run the length of the side edges, despite interuption by wheel wells 126 and 127. Centrally, floor 128 is sloped downwardly along the length thereof from front to rear along the line 132. At the front edge 128a of floor 123, the central slope is zero, with the maximum slope being at the rearward edge 128b. The slope is uniform inwardly from the sides as may be seen in FIGS. 9–11, inclusive. Wedge shaped braces 133 and 134 (see FIG. 12), as well as 135, are provided as required along the length of floor 123 thereunder. A horizontal mesh or grating 136 is provided overlying the entire area of floor 123 with supports 137 provided thereunder at intervals which yet do not interfere with the central and rearward drainage over the floor. Cutouts are provided in floor 123 and grating 136 at the wheel wells 126 and 127. Outlining edge walls on floor 123 may be provided circumferential to the periphery of the wheel wells for additional support if desired (not shown). Both floor 123 and grating 136 may be provided in two sections divided along the central line if desired for ease in use and handling.

Now referring to the right hand side of FIG. 8 and the lower portion of FIG. 7, as well as the lower portion of FIG. 6, therein is seen a like drainage construction on rear floor portion 123a. The rear door 139 of the truck typically has a lowermost portion 139a to abut the upper surface of floor portion 123a and is received in port or opening 140 in rear wall 141 of the truck body.

Floor 142 is rectangular in form, abutting or substantially abutting front wall 123b and side walls 125 and 124. The front edge of floor 142 is elevated by vertical wall 143 abutting wall 123b, while the side edges of floor 142 are elevated to normal horizontal position by side walls 144 and 145 abutting or substantially abutting side walls 124 and 125, respectively. The center line 142a slopes to the rear with the entire floor sloping in from the side edges thereof to the center as seen in the figures.

Overlying floor 142 is normally horizontal grating or mesh 146 (of metal or plastic like mesh or grating 136), this grating congruent with floor 142 as to its rectangular shape and supported by spaced members 147. Members 137 with respect to grating 136 and 147 with respect to grating 146 may fit into openings in floors 123 and 142 (not shown) for locating and stabilization purposes, if desired (recesses or the like). Again, floor 142 and grating 146 may be made in two parts with suitable center bracing or vertical supports provided as required. Under bracing may be provided for floor 142 if required in the manner of the under braces for floor 128 (133, etc).

The operation of the floors described previously is similar, although their geometry is somewhat different. Both basic floors (longitudinally corrugated in the first version and centrally sloped in the second) may be made integral with the truck as the bottom floor or above a flat bottom floor. In such case, the sheet or sheets are welded, riveted or otherwise fixedly attached into the truck structure. Sealing may be applied at the joints. Alternatively, the sections may be laid in in removable fashion (shown). The basic floors may be integral or sectioned. In the latter case they are generally at least sectioned down the center line. If suitable circumferential (edge) abutting walls are provided they can be divided longitudinally or transversely, or both, typically centrally in each case.

A grating is almost necessarily employed with the form of FIGS. 6–12, inclusive. A grating may be employed with the first form of FIGS. 1–5, inclusive. In the former case, support legs or members are almost certainly to be required unless the grating is of great strength and rigidity. On the other hand, in the corrugated form, such are not required, the corrugation hills serving to support the grating.

In use, once installed, water and liquids falling on the floors are conveyed to the rear (and centrally in the first form) by the slope of the floor portions, thus to exit from the truck. In the second form, drainage from the front floor is to the rear floor and thence out the truck. In both cases, the truck interiors may be hosed out with the draining water naturally exiting according to the configuration of the flooring.

FIG. 13

As an alternative, its is contemplated that, in order to improve lateral drainage in the construction of FIGS. 6-12 inclusive, a double V construction (in end view from the rear of the truck bed) floor be employed. That is, in the view of FIG. 6, plan from above, the floor would be divided into two parts along line 132 each such part or sheet would have the configuration of sheet 128 of FIGS. 6-8 inclusive, but only one half the width. This would double the rate of lateral drainage (to the center of each such sheet) while retaining the same rate or slope of longitudinal drainage for each half of the truck floor. Identical parts in the view of FIG. 13 to FIG. 7 are numbered the same but primed, with each of the two sheets of FIG. 13 numbered the same as sheet 128 of FIG. 7, but primed. The sheet 142 on step 123a may be doubled or not. Less supports for grating 136' are required with this form.

From the foregoing, it will be seen that this invention is one well adapted to attain all of the ends and objects hereinabove set forth together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herin set forth or shown in the accompanying drawings is to be interpreted as illustrative and not in a limiting sense.

We claim:

1. An insert flooring for a substantially rectangular truck bed whose area and boundaries are defined by a normally substantially horizontal rectangular bottom wall, a normally substantially vertical rectangular front wall and two normally substantially vertical rectangular side walls, said side walls meeting at their front ends at substantial right angles with the side edges of the front wall and the side and front walls meeting the bottom wall at their lower edges, there being at least one wheel well on each side of the truck bed intermediate the front and rear ends thereof, comprising a substantially rectangular sheet of rigid, strong, water resistant material substantially overlying the entire bottom wall of the truck bed substantially abutting the front wall thereof with the front edge thereof and the side walls thereof with the side edges thereof with cut out portions therein for the said wheel wells said sheet corrugated centrally between the wheel wells longitudinally substantially the entire length thereof from front to rear and wheel well to wheel well, the crests of said corrugations paralleling one another and normally horizontal so as to normally parallel the truck bed bottom wall surface, the valleys of said corrugations substantially paralleling one another and increasing substantially uniformly in depth from the front edge of said sheet to the rear edge of said sheet, the areas behind the wheel wells of said sheet corrugated in the same manner as the area between the wheel wells and the areas in front of the wheel wells of said sheet each corrugated in such manner as to pass liquid in the corrugation valleys centrally and rearwardly of said truck bed, the areas of the truck bed immediately inboard of the wheel wells from front to back comprising corrugation valleys.

2. An insert flooring as in claim 1 wherein the crests and valleys of said corrugations are substantially rectangular in form in transverse section.

3. An insert flooring as in claim 1 wherein the side edges of the sheet rearward of the wheel wells have crests of corrugations thereat.

4. An insert flooring as in claim 1 wherein the depth of the corrugations inboard of the wheel wells at the front of the sheet is substantially zero, the depth of the corrugations rearward of the wheel wells next the wheel wells is substantially zero and the depth of the corrugations forward of the wheel wells abutting the front and side walls of the truck bed is substantially zero.

5. Improvements in the bottom wall flooring for a substantially rectangular truck bed whose area and boundaries are defined by the normally substantially horizontal portion of the said bottom wall, a normally substantially vertical rectangular front wall and two normally substantially vertical rectangular side walls, said side walls meeting at their front ends at substantial right angles with the side edges of the front wall and the side and front walls meeting the said bottom wall at their lower edges, there being at least one wheel well on each side of the truck bed intermediate the front and rear ends thereof, comprising said bottom wall flooring comprising a substantially rectangular sheet of rigid, strong, water resistant material making up the entire bottom surface of the truck bed by abutting and connecting to the front wall thereof with the front edge thereof and the side walls of the truck bed with the side edges thereof, said sheet corrugated longitudinally substantially the entire length thereof from front to rear and wheel well to wheel well centrally between the said wheel wells, the crests of said corrugations paralleling one another and normally horizontal, the valleys of said corrugations substantially paralleling one another and increasing substantially uniformly in depth from the front edge of said sheet to the rear edge of said sheet, whereby to incline rearwardly from the horizontal, the areas behind the wheel wells of said sheet corrugated in the same manner as the area between the wheel wells and the areas in front of the wheel wells of said sheet each corrugated in such manner as to pass liquid in the corrugation valleys centrally and rearwardly of said truck bed, the areas of the truck bed immmediately inboard of the wheel wells from front to back comprising corrugation valleys.

6. Improvements as in claim 5 wherein the crests and valleys of said corrugations are substantially rectangular in form in transverse section.

7. Improvements as in claim 5 wherein the side edges of the sheet rearward of the wheel wells have crests of corrugations thereat.

8. Improvements as in claim 5 wherein the depth of the corrugations inboard of the wheel wells at the front of the sheet is substantially zero, the depth of the corrugations rearward of the wheel wells next the wheel wells is substantially zero and the depth of the corrugations forward of the wheel wells abutting the front and side walls of the truck bed is substantially zero.

* * * * *